United States Patent
Park et al.

(10) Patent No.: US 12,322,171 B2
(45) Date of Patent: Jun. 3, 2025

(54) DISPLAY DEVICE AND DRIVING METHOD THEREOF

(71) Applicant: Samsung Display Co., LTD., Yongin-si (KR)

(72) Inventors: So Young Park, Yongin-si (KR); Soon Gyu Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/234,803

(22) Filed: Aug. 16, 2023

(65) Prior Publication Data

US 2024/0169717 A1    May 23, 2024

(30) Foreign Application Priority Data

Nov. 23, 2022  (KR) .................. 10-2022-0158638

(51) Int. Cl.
*G06V 10/98*  (2022.01)
*G06T 7/00*   (2017.01)
*G06V 40/12*  (2022.01)
*G06V 40/13*  (2022.01)

(52) U.S. Cl.
CPC .......... *G06V 10/993* (2022.01); *G06T 7/0002* (2013.01); *G06V 40/13* (2022.01); *G06V 40/1365* (2022.01)

(58) Field of Classification Search
CPC .. G06V 10/993; G06V 40/13; G06V 40/1365; G06V 40/1318; G06V 10/98; G06T 7/0002; G06F 21/32; G09G 3/20; G09G 2360/14

See application file for complete search history.

(56) References Cited

U.S. PATENT DOCUMENTS

| 5,999,637 | A | * | 12/1999 | Toyoda | G06Q 20/4014 382/280 |
| 7,593,553 | B2 | * | 9/2009 | Fujii | G06V 40/1335 382/284 |
| 10,572,749 | B1 | * | 2/2020 | Bonev | G06V 40/1347 |
| 10,868,984 | B1 | * | 12/2020 | Charlton | H04N 25/62 |
| 2006/0104493 | A1 | * | 5/2006 | Hsieh | G06V 40/1371 382/125 |

(Continued)

FOREIGN PATENT DOCUMENTS

| KR | 10-2022-0030474 A | 3/2022 |
| WO | WO 2017/211152 A1 | 12/2017 |

*Primary Examiner* — Antonio Xavier
(74) *Attorney, Agent, or Firm* — Womble Bond Dickinson (US) LLP

(57) ABSTRACT

A display device includes: at least one fingerprint sensor configured to sense a fingerprint of a user corresponding to a first fingerprint sensing area of a display panel; an image generator configured to generate a target fingerprint image based on a sensing signal output from the at least one fingerprint sensor; an image analyzer configured to detect a defect in the target fingerprint image based on at least one first fingerprint image corresponding to the first fingerprint sensing area and at least one second fingerprint image corresponding to a second fingerprint sensing area spaced apart from the first fingerprint sensing area of the display panel; and an image corrector configured to correct the defect in the target fingerprint image.

20 Claims, 14 Drawing Sheets

(56) References Cited

U.S. PATENT DOCUMENTS

| | | | | |
|---|---|---|---|---|
| 2010/0303311 | A1* | 12/2010 | Shin | G06V 40/13 |
| | | | | 382/124 |
| 2015/0286855 | A1* | 10/2015 | Neskovic | G06V 40/1353 |
| | | | | 382/125 |
| 2016/0055367 | A1* | 2/2016 | Hara | G06V 10/987 |
| | | | | 382/125 |
| 2018/0032788 | A1* | 2/2018 | Krenzer | G06V 40/1335 |
| 2021/0248350 | A1* | 8/2021 | Chang | G06V 40/1394 |
| 2022/0067331 | A1 | 3/2022 | Lee et al. | |
| 2022/0222964 | A1* | 7/2022 | Kwan | G06V 40/13 |
| 2023/0326255 | A1* | 10/2023 | Takahata | G06V 40/1347 |
| 2024/0096088 | A1* | 3/2024 | Hirokawa | G06V 10/993 |
| 2024/0193985 | A1* | 6/2024 | Sammoura | G06V 40/1335 |

* cited by examiner

FIG. 1B
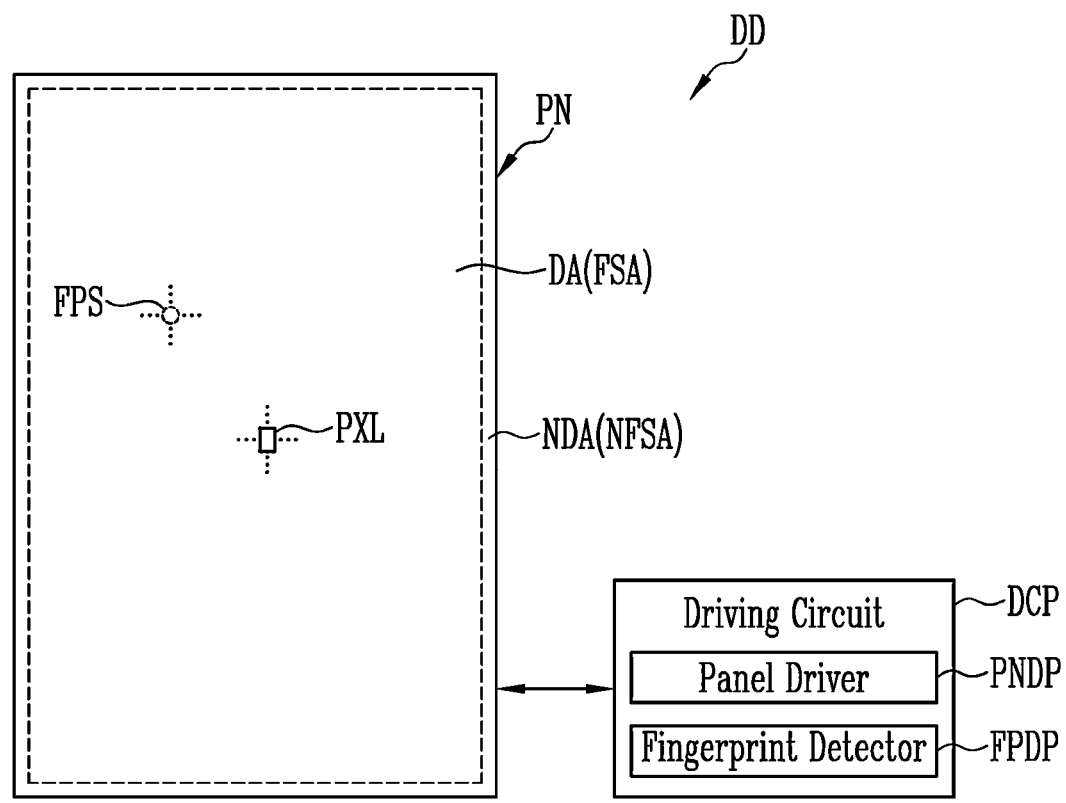
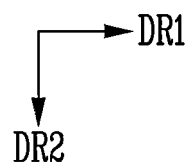

FIG. 7
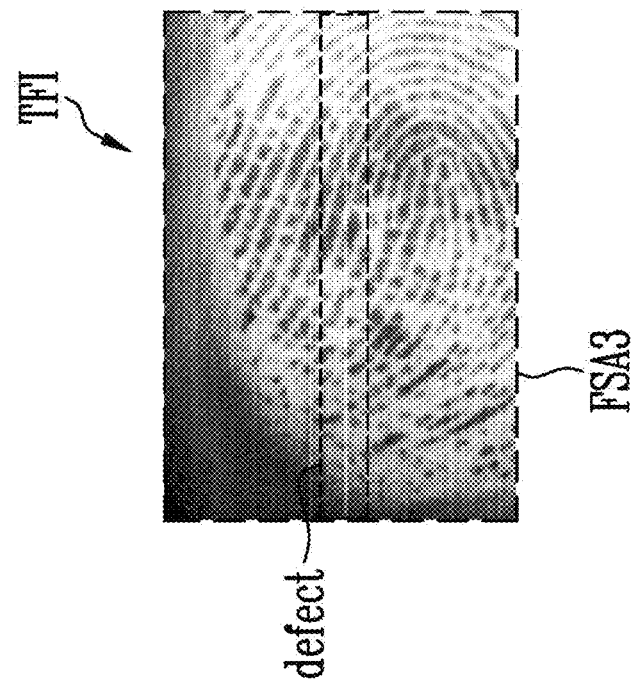
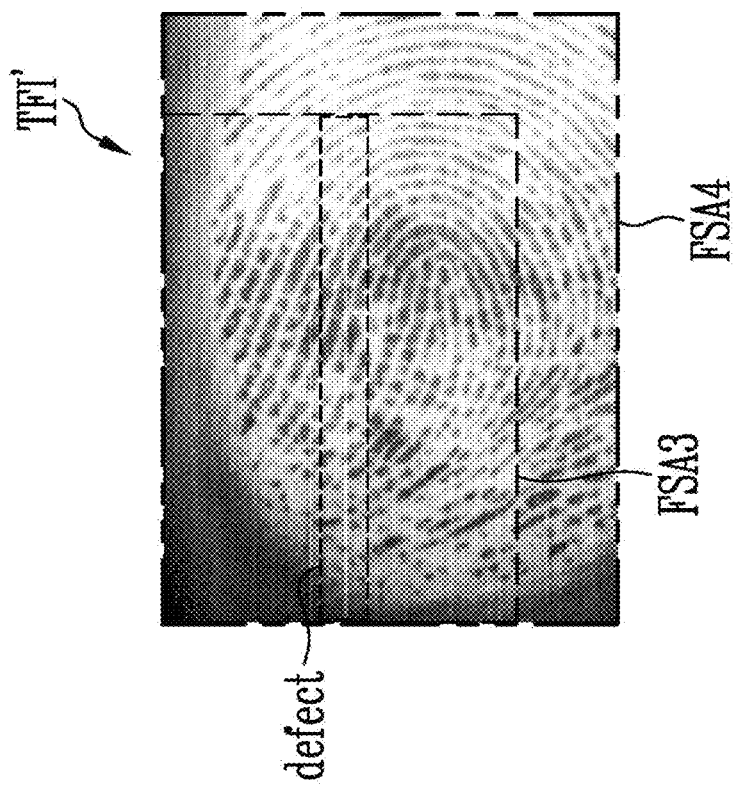

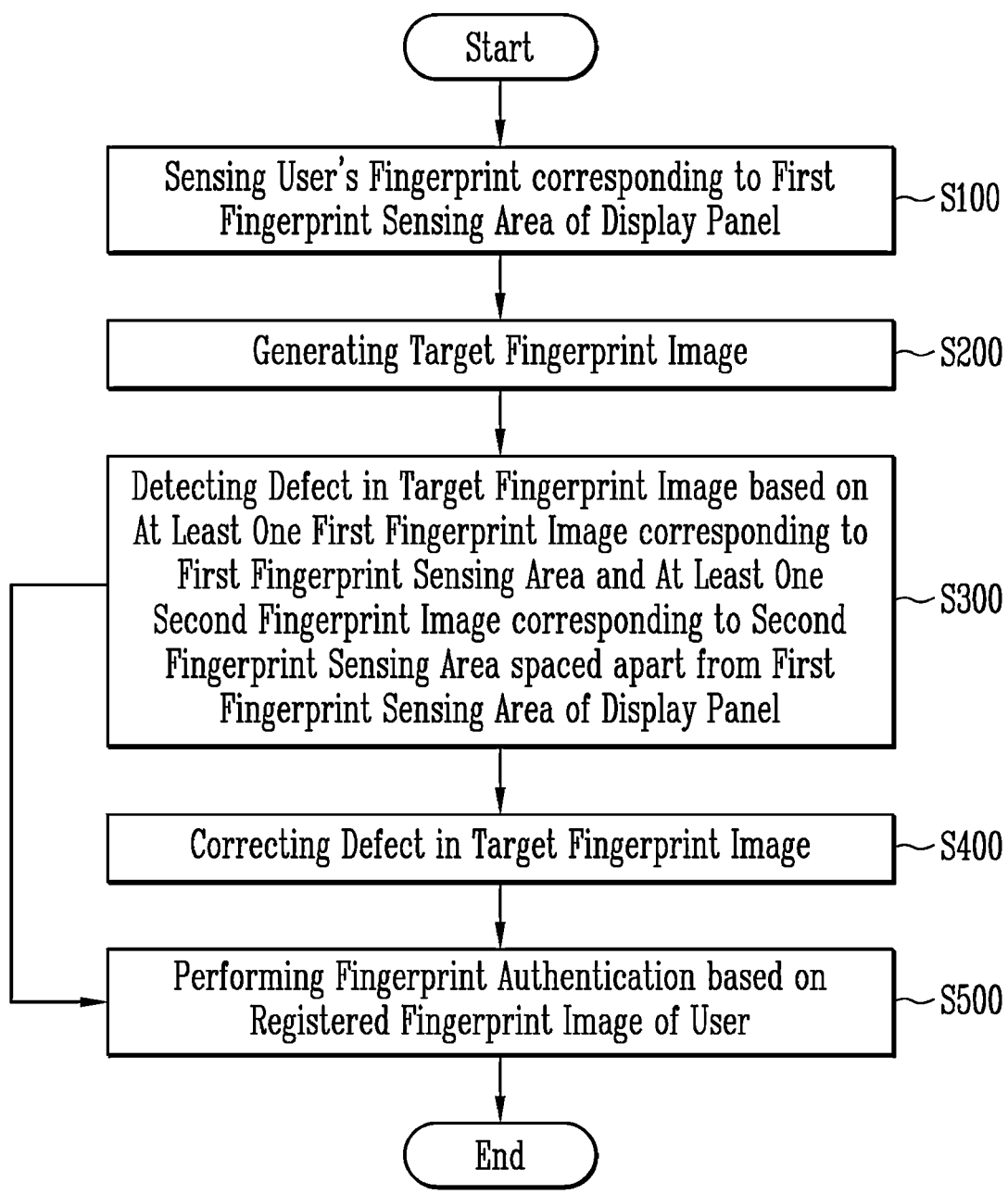

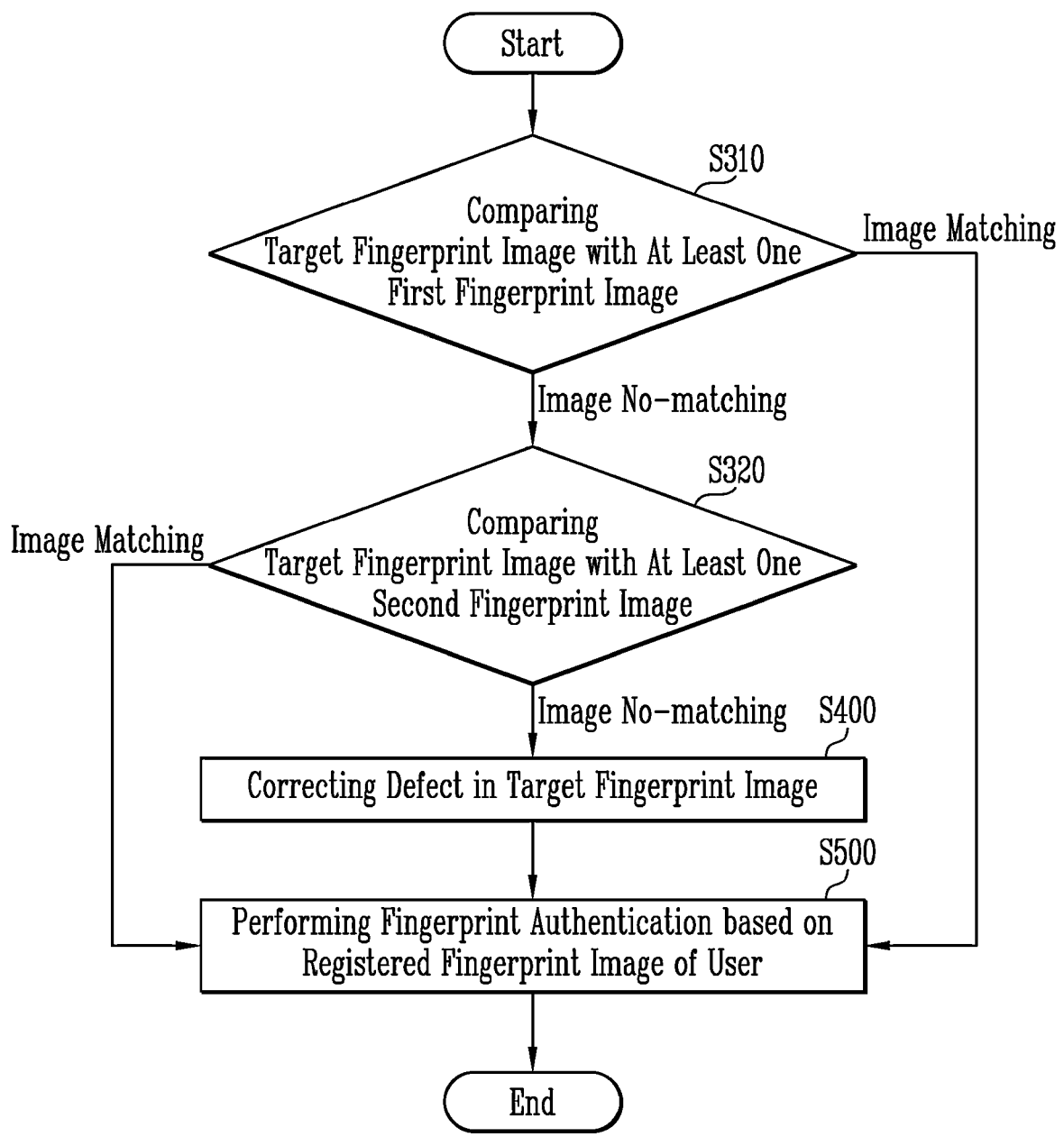

DISPLAY DEVICE AND DRIVING METHOD THEREOF

CROSS-REFERENCE TO RELATED APPLICATION

The present application claims priority to and the benefit of Korean Patent Application No. 10-2022-0158638, filed Nov. 23, 2022, the entire disclosure of which is incorporated herein by reference.

BACKGROUND

1. Field

Aspects of some embodiments of the present invention relate to a display device and a driving method thereof.

2. Discussion

Recently, as display devices such as smart phones and tablet PCs are utilized in various fields and applications, a biometric information authentication method using a user's fingerprint or the like may be used. In order to provide a fingerprint sensing function, a fingerprint sensor may be provided in a form embedded in a display device or attached to an upper and/or lower portion of the display device.

However, when a user repeatedly uses the fingerprint sensing function, the fingerprint sensor may deteriorate over time, a defect may occur in a fingerprint image, and thus the fingerprint sensing function of the display device may deteriorate.

The above information disclosed in this Background section is only for enhancement of understanding of the background and therefore the information discussed in this Background section does not necessarily constitute prior art.

SUMMARY

Aspects of some embodiments include a display device and a driving method of the display device, which can relatively accurately detect a defect in a fingerprint image due to deterioration of a fingerprint sensor.

Aspects of some embodiments include a display device and a driving method of the display device, which can improve the fingerprint authentication function by correcting the defect in the fingerprint image in various ways.

According to some embodiments of the present invention, a display device includes: at least one fingerprint sensor configured to sense a fingerprint of a user corresponding to a first fingerprint sensing area of a display panel, an image generator which configured to generate a target fingerprint image based on a sensing signal output from the at least one fingerprint sensor, an image analyzer which configured to detect a defect in the target fingerprint image based on at least one first fingerprint image corresponding to the first fingerprint sensing area and at least one second fingerprint image corresponding to a second fingerprint sensing area spaced apart from the first fingerprint sensing area of the display panel, and an image corrector which configured to correct the defect in the target fingerprint image.

According to some embodiments, the image corrector is configured to correct the defect in the target fingerprint image based on a size of the defect of the target fingerprint image.

According to some embodiments, the target fingerprint image, the at least one first fingerprint image, and the at least one second fingerprint image may have fingerprint information of a same part of the user's body.

According to some embodiments, the at least one first fingerprint image may be sensed through the first fingerprint sensing area and stored in advance, and the at least one second fingerprint image may be sensed through the second fingerprint sensing area and stored in advance.

According to some embodiments, the image analyzer may include a first image comparator configured to compare the target fingerprint image with the at least one first fingerprint image, a second image comparator configured to compare the target fingerprint image with the at least one second fingerprint image, and a controller configured to determine whether to detect the defect in the target fingerprint image according to a comparison result with the at least one first fingerprint image and a comparison result with the at least one second fingerprint image.

According to some embodiments, the controller is configured to determine that the defect is detected in the target fingerprint image based on the target fingerprint image not matching the at least one first fingerprint image and the target fingerprint image not matching the at least one second fingerprint image.

According to some embodiments, based on the defect of the target fingerprint image being greater than or equal to a predetermined reference size, the corrector is configured to mask the defect in the target fingerprint image.

According to some embodiments, based on the defect of the target fingerprint image being greater than or equal to a predetermined reference size, the corrector is configured to generate a masking image covering the defect in the target fingerprint image.

According to some embodiments, the display device may further include an image matcher configured to perform fingerprint authentication based on the target fingerprint image, the masking image, and a registered fingerprint image preset by a user.

According to some embodiments, the at least one fingerprint sensor is configured to sense fingerprint of the user through a third fingerprint sensing area included in the first fingerprint sensing area of the display panel. According to some embodiments, based on the defect of the target fingerprint image being greater than or equal to a predetermined reference size, the at least one fingerprint sensor is configured to sense an additional user's fingerprint through a fourth fingerprint sensing area overlapping an entirety of the third fingerprint sensing area based on the additional user's fingerprint being input to the third fingerprint sensing area of the display panel. The fourth fingerprint sensing area may have a larger area than the third fingerprint sensing area.

According to some embodiments, the at least one fingerprint sensor may be exposed to light for a first exposure time. According to some embodiments, based on the defect of the target fingerprint image being greater than or equal to a predetermined reference size, the at least one fingerprint sensor in an area corresponding to the defect of the target fingerprint image may be exposed to the light for a second exposure time longer than the first exposure time based on an additional user's fingerprint being input to the first fingerprint sensing area.

According to some embodiments, based on the defect of the target fingerprint image being less than a predetermined reference size, the corrector is configured to correct the defect in the target fingerprint image based on defect information and pre-stored calibration information.

According to some embodiments, based on the defect of the target fingerprint image being less than a predetermined reference size, the corrector is configured to correct the defect in the target fingerprint image by erasing the defect in the target fingerprint image through image processing.

According to some embodiments, based on the defect of the target fingerprint image being less than a predetermined reference size, the corrector is configured to correct the defect in the target fingerprint image by masking the defect in the target fingerprint image.

According to some embodiments of the present invention, in a method of driving a display device, the method includes: generating a sensing signal by sensing a fingerprint of a user corresponding to a first fingerprint sensing area of a display panel, generating a target fingerprint image based on the sensing signal, detecting a defect in the target fingerprint image based on at least one first fingerprint image corresponding to the first fingerprint sensing area and at least one second fingerprint image corresponding to a second fingerprint sensing area spaced apart from the first fingerprint sensing area of the display panel, and correcting the defect in the target fingerprint image.

According to some embodiments, correcting the defect may include correcting the defect in the target fingerprint image based on a size of the defect of the target fingerprint image.

According to some embodiments, the target fingerprint image, the at least one first fingerprint image, and the at least one second fingerprint image may have fingerprint information of a same part of the user's body.

According to some embodiments, the at least one first fingerprint image may be sensed through the first fingerprint sensing area and stored in advance, and the at least one second fingerprint image may be sensed through the second fingerprint sensing area and stored in advance.

According to some embodiments, detecting the defect may include comparing the target fingerprint image with the at least one first fingerprint image, and comparing the target fingerprint image with the at least one second fingerprint image.

According to some embodiments, it may be determined that the defect is detected in the target fingerprint image based on the target fingerprint image not matching the at least one first fingerprint image and the target fingerprint image not matching the at least one second fingerprint image.

BRIEF DESCRIPTION OF THE DRAWINGS

The above and other features of embodiments of the present invention will become more apparent by describing in further detail aspects of some embodiments thereof with reference to the accompanying drawings, in which:

FIGS. 1A, 1B, and 1C are plan views for explaining a display device according to some embodiments of the present invention.

FIGS. 5, 6, 7, and 8 are diagrams for explaining correction methods when a large defect occurs in a target fingerprint image according to some embodiments of the present invention.

FIG. 12 is a flowchart for explaining a driving method of a display device in according to some embodiments of the present invention.

FIG. 13 is a flowchart for explaining a step of detecting a defect in a target fingerprint image according to some embodiments of the present invention.

DETAILED DESCRIPTION

Figure 1A:
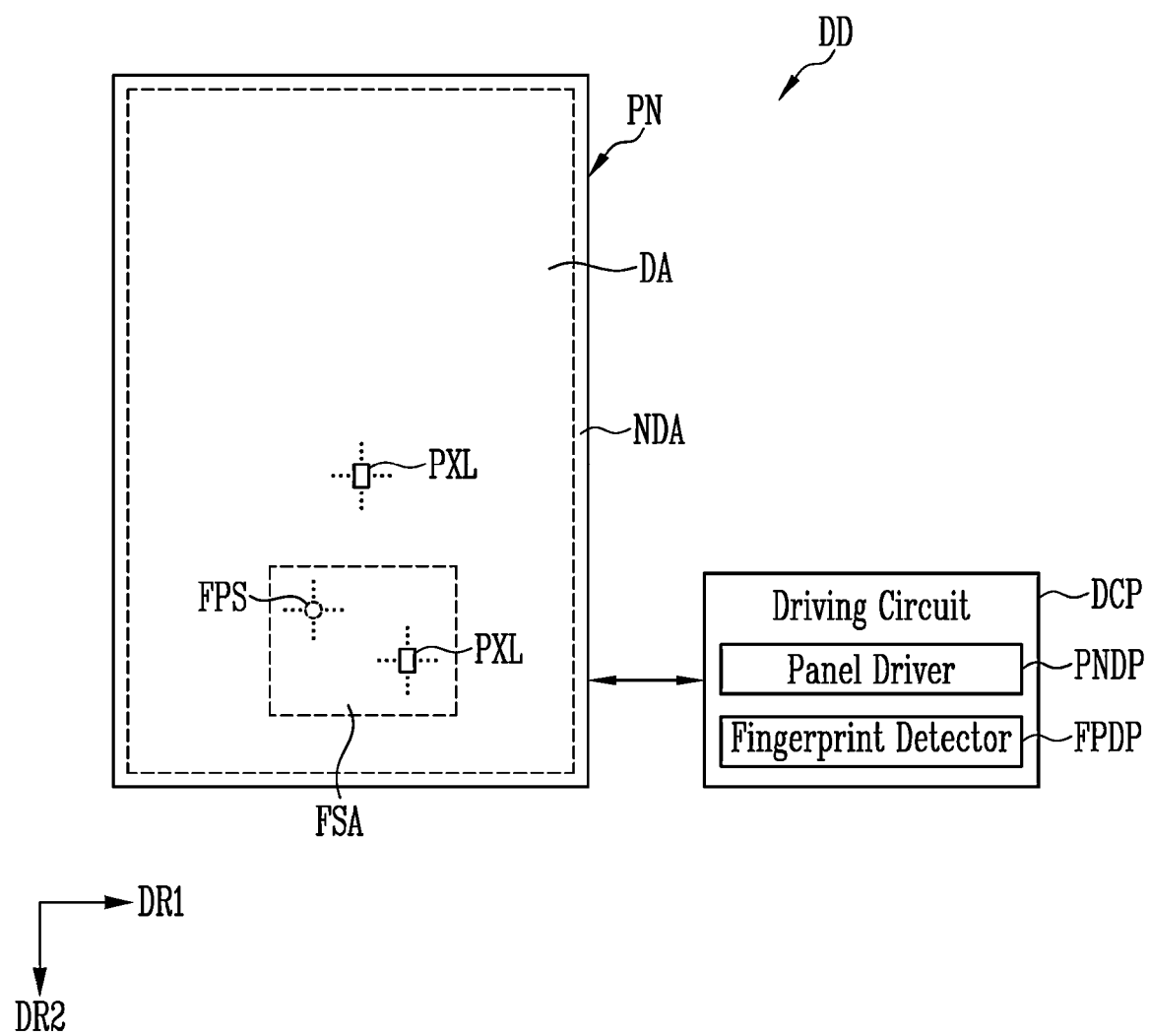

Aspects of some embodiments of the present invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In describing the drawings, like reference numerals have been used for like elements. In the accompanying drawings, the dimensions of the structures are enlarged than the actual size in order to clearly explain the invention. It will be understood that, although the terms "first", "second", etc. may be used herein to describe various elements, these elements should not be limited by these terms. These terms are only used to distinguish one element from another element. For instance, a first element discussed below could be termed a second element without departing from the scope of the invention. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the following description, when a first part is "connected" to a second part, this includes not only the case where the first part is directly connected to the second part, but also the case where a third part is interposed therebetween and they are connected to each other.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, aspects of some embodiments of the present invention will be described in more detail with reference to the accompanying drawings.

Figure 1C:
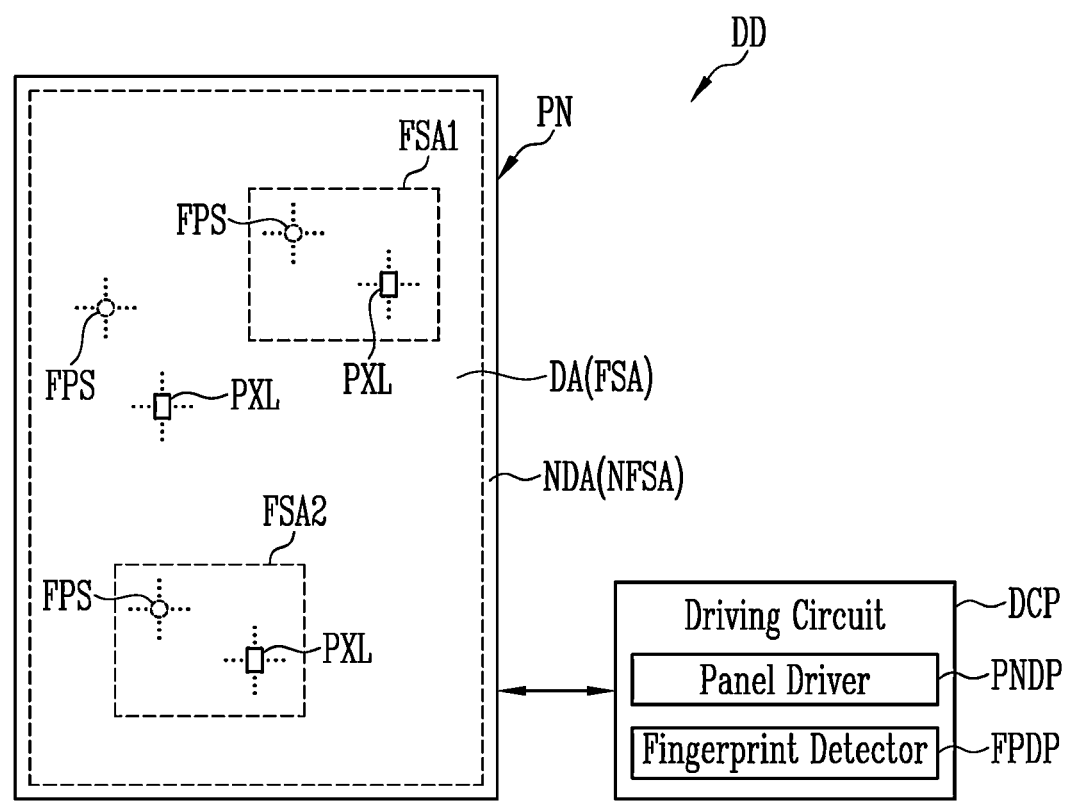

FIGS. 1A to 1C are plan views for explaining a display device according to some embodiments of the present invention. For example, FIGS. 1A to 1C are plan views schematically illustrating a display panel included in the display device according to embodiments of the present invention and a driving circuit for driving the display panel. For convenience of description, the display panel and the driving circuit are separately shown in FIGS. 1A to 1C, but embodiments according to the present invention are not limited thereto. For example, all or part of the driving circuit may be integrally implemented on the display panel.

Referring to FIGS. 1A to 1C, a display device DD according to some embodiments of the present invention may be provided in various shapes. For example, the display device DD may be provided in the form of a rectangular plate having two pairs of sides parallel to each other. The display device DD may display text, video, pictures, 2D or 3D images, and the like in an image display direction (e.g., a direction perpendicular or normal with respect to a display surface).

All or at least a portion of the display device DD may have flexibility. When the entire display device DD is flexible, the display device DD may be a rollable display device. When a portion of the display device DD is flexible, the display device DD may be a foldable display device.

The display device DD may include a display panel PN and a driving circuit DCP for driving the display panel PN.

The display panel PN may include a display area DA and a non-display area NDA. At least one pixel PXL may be provide in the display area DA to display images. The non-display area NDA may be located on at least one side of the display area DA. For example, the non-display area NDA may surround the display area DA (e.g., in a periphery or outside a footprint of the display area DA).

The at least one pixel PXL may be provided in the display area DA. The at least one pixel PXL may include at least one light emitting element. The display device DD may display images in the display area DA by driving the at least one pixel PXL in response to input image data.

The non-display area NDA may be an area surrounding at least one side of the display area DA and may be an area other than the display area DA. The non-display area NDA may include a wiring area, a pad area, and/or various dummy areas.

One area of the display device DD may be set as a fingerprint sensing area FSA capable of sensing a user's fingerprint or the like. That is, the display area DA may overlap the fingerprint sensing area FSA. The fingerprint sensing area FSA may include some pixels PXL among the at least one pixel PXL provided in the display area DA.

As shown in FIG. 1A, only a portion of the display area DA may be set as the fingerprint sensing area FSA. Also, as shown in FIG. 1B, the entire display area DA may be set as the fingerprint sensing area FSA. When the entire display area DA is set as the fingerprint sensing area FSA, the non-display area NDA surrounding the display area DA may be a fingerprint non-sensing area NFSA. At least one fingerprint sensor FPS together with the at least one pixel PXL may be located in the fingerprint sensing area FSA.

As shown in FIG. 1C, when the entire display area DA is set as the fingerprint sensing area FSA, the fingerprint sensing area FSA may include a first fingerprint sensing area FSA1 and a second fingerprint sensing area FSA2 spaced apart from the first fingerprint sensing area FSA1. The first fingerprint sensing area FSA1 may be an area where the user's fingerprint is input when the display device DD performs a fingerprint sensing function. That is, the first fingerprint sensing area FSA1 may refer to an area where a part of a user's body (for example, a finger) is input during fingerprint authentication. The second fingerprint sensing area FSA2 may be an area spaced apart from the first fingerprint sensing area FSA1 and may be an area in which the display device DD does not perform the fingerprint sensing function. That is, the second fingerprint sensing area FSA2 may refer to an area other than the first fingerprint sensing area FSA1 where the fingerprint sensing function is performed. For example, the second fingerprint sensing area FSA2 may be an area that does not overlap with the first fingerprint sensing area FSA1. Positions, sizes, intervals, etc. of the first fingerprint sensing area FSA1 and the second fingerprint sensing area FSA2 are not limited to those shown in FIG. 1C and may vary depending on the position of the user's fingerprint, the part of the user's body, or the like.

The at least one fingerprint sensor FPS may be located on the other surface of the display device DD facing one surface (for example, an image display surface) on which images are displayed. That is, the at least one fingerprint sensor FPS may be located on a surface of the display device DD on which images are not displayed. The at least one fingerprint sensor FPS may use a light emitting element provided in the at least one pixel PXL located in or around the fingerprint sensing area FSA as a light source for detecting a fingerprint. To this end, the at least one fingerprint sensor FPS may overlap a portion of the at least one pixel PXL located in the fingerprint sensing area FSA or may be arranged around the at least one pixel PXL.

The at least one fingerprint sensor FPS may be a capacitive fingerprint sensor or an optical fingerprint sensor, but embodiments according to the present invention are not limited thereto. For example, the at least one fingerprint sensor FPS may be an ultrasonic fingerprint sensor or an infrared fingerprint sensor. Hereinafter, for convenience of description, it is assumed that the at least one fingerprint sensor FPS is an optical fingerprint sensor, but embodiments according to the present disclosure are not limited thereto.

The at least one fingerprint sensor FPS may sense the user's fingerprint using the light emitting element included in the at least one pixel PXL of the fingerprint sensing area FSA. That is, the at least one fingerprint sensor FPS may sense the user's fingerprint by detecting light emitted from the light emitting element and then reflected by the user. The at least one fingerprint sensor FPS may be used for performing various functions such as a touch sensor or a scanner as well as fingerprint sensing.

The display device DD may detect a shape, pattern, etc. of an object positioned on the display device DD using the at least one fingerprint sensor FPS located in the fingerprint sensing area FSA included in the display area DA. For example, the display device DD may sense the user's fingerprint. Also, the display device DD may detect the user's fingerprint using light emitted from the at least one pixel PXL, but embodiments according to the present invention are not limited thereto. For example, the display device DD may detect the user's fingerprint by using a separate external light source for detecting a fingerprint.

The driving circuit DCP may drive the display panel PN. For example, the driving circuit DCP may output a data signal corresponding to image data to the display panel PN, output a driving signal for the at least one fingerprint sensor FPS, and receive an electrical signal (or a sensing signal) received from the at least one fingerprint sensor FPS. The driving circuit DCP may detect the shape of the user's fingerprint using the electrical signal.

The driving circuit DCP may include a panel driver PNDP and a fingerprint detector FPDP. For convenience of description, the panel driver PNDP and the fingerprint detector FPDP are separately shown in FIGS. 1A and 1B, but embodiments according to the present invention are not limited thereto. For example, at least a part of the fingerprint detector FPDP may be integrated with the panel driver PNDP or operated in conjunction with the panel driver PNDP.

The panel driver PNDP may supply the data signal corresponding to an image data signal to the at least one pixel PXL of the display area DA. Accordingly, the display panel PN may display images corresponding to the image data.

The panel driver PNDP may supply a driving signal for sensing a fingerprint to the at least one pixel PXL. The driving signal for sensing a fingerprint may be provided so that the at least one pixel PXL, which is a light source for the at least one fingerprint sensor FPS, emits light. The driving signal for sensing a fingerprint may be transmitted to at least one pixel PXL provided in a specific area of the display panel PN. For example, the driving signal for sensing a fingerprint may be transmitted to the at least one pixel PXL provided in the fingerprint sensing area FSA of the display panel PN. The driving signal for sensing a fingerprint may be transmitted to the at least one pixel PXL of the fingerprint sensing area FSA by the fingerprint detector FPDP.

The fingerprint detector FPDP may transmit the driving signal for driving the at least one fingerprint sensor FPS to the at least one fingerprint sensor FPS, and detect the user's fingerprint based on the electrical signal (or sensing signal) received from the at least one fingerprint sensor FPS.

Figure 2:
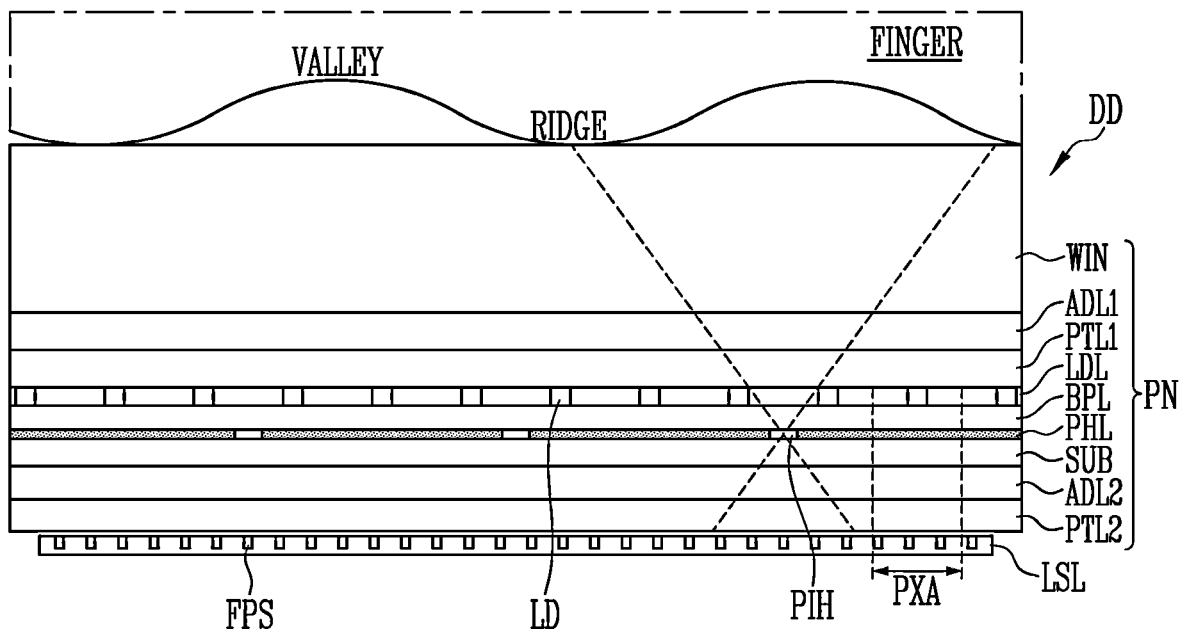
FIG. 2 is a cross-sectional view for explaining the display device of FIGS. 1A, 1B, and 1C according to some embodiments of the present invention.

FIG. 2 is a cross-sectional view for explaining the display device of FIGS. 1A to 1C.

Referring to FIGS. 1A to 1C and 2, the display device DD may include the display panel PN and a light sensing array LSL located on one surface of the display panel PN in the fingerprint sensing area FSA. In addition, the display device DD may include a circuit element layer BPL, a light emitting element layer LDL, a first passivation layer PTL1, a first adhesive layer ADL1, and a window WIN sequentially located on one surface (for example, an upper surface) of a substrate SUB. In addition, the display device DD may include a second adhesive layer ADL2 and a second passivation layer PTL2 sequentially located on the other surface (for example, a lower surface) of the substrate SUB in the fingerprint sensing area FSA.

The substrate SUB may be a base material of the display panel PN and may be a transparent substrate through which light may be substantially transmitted. The substrate SUB may be a rigid substrate including glass or tempered glass or a flexible substrate made of plastic. However, the material of the substrate SUB is not limited thereto, and the substrate SUB may be made of various materials.

The circuit element layer BPL may be located on one surface of the substrate SUB and may include at least one conductive layer. The circuit element layer BPL may include a plurality of circuit elements constituting a pixel circuit of at least one pixel PXL and wirings for supplying various power sources and signals for driving the at least one pixel PXL. For example, the circuit element layer BPL may include a plurality of conductive layers for constituting various circuit elements, such as at least one transistor and a capacitor, and wirings connected thereto. Also, the circuit element layer BPL may include at least one insulating layer provided between the plurality of conductive layers.

The light emitting element layer LDL may be located on one surface of the circuit element layer BPL. The light emitting element layer LDL may include at least one light emitting element LD connected to the circuit elements and/or the wirings of the circuit element layer BPL through contact holes or the like. For example, the light emitting element layer LDL may include at least one light emitting element LD located in the pixel areas PXA. The at least one light emitting element LD may be composed of an organic light emitting diode or an inorganic light emitting diode such as a micro light emitting diode and a quantum dot light emitting diode. In addition, the light emitting element LD may be a light emitting element composed of an organic material and an inorganic material in combination. Furthermore, the at least one pixel PXL may include a single light emitting element LD or may include a plurality of light emitting elements LD connected in series, in parallel, or in series and parallel.

The at least one pixel PXL may include the circuit elements located in the circuit element layer BPL and the at least one light emitting element LD located in the light emitting element layer LDL.

The first passivation layer PTL1 may be located on the light emitting element layer LDL to cover the display area DA. The first passivation layer PTL1 may include a sealing member such as a thin film encapsulation (TFE) layer or an encapsulation substrate, and may additionally include a protective film or the like in addition to the sealing member.

The first adhesive layer ADL1 may be located between the first passivation layer PTL1 and the window WIN to couple the first passivation layer PTL1 and the window WIN. The first adhesive layer ADL1 may include a transparent adhesive such as optically clear adhesive (OCA), and may include various other adhesive materials.

The window WIN may be a protective member located on an uppermost portion of a module of the display device DD including the display panel PN, and may be a transparent substrate through which light is substantially transmitted. The window WIN may have a multilayer structure selected from a glass substrate, a plastic film, and a plastic substrate. The window WIN may include a rigid or flexible substrate, but embodiments according to the present invention are not limited thereto.

The display device DD may further include a polarizer, an anti-reflection layer, and/or a touch sensor layer (touch electrode layer). For example, the display device DD may further include the polarizer and/or the touch sensor layer located between the first passivation layer PTL1 and the window WIN.

The touch sensor layer may include a plurality of sensing electrodes (or sensing cells). The driving circuit DCP may detect the presence or absence of a touch input and the position (or coordinates or area) of the touch input based on a change in capacitance between the sensing electrodes.

The second passivation layer PTL2 may be located on the other surface of the substrate SUB. The second passivation layer PTL2 may be coupled to the substrate SUB by the second adhesive layer ADL2.

The second adhesive layer ADL2 may firmly bond (or adhere) the substrate SUB and the second passivation layer PTL2. The second adhesive layer ADL2 may include a transparent adhesive such as OCA. The second adhesive layer ADL2 may include a pressure sensitive adhesive (PSA), in which an adhesive substance acts on an adhesive surface when pressure for adhesion is applied.

The second passivation layer PTL2 may block oxygen and moisture from entering from outside and may be provided in a single layer or multi-layer structure. The second passivation layer PTL2 may be configured in the form of a film to further secure the flexibility of the display panel PN. The second passivation layer PTL2 may be coupled to the light sensing array LSL through another adhesive layer including a transparent adhesive such as OCA.

The light sensing array LSL may be attached to the other surface (for example, the rear surface) of the display panel PN through an adhesive or the like so as to overlap with at least one area of the display panel PN. For example, the light sensing array LSL may be arranged to overlap the display panel PN in the fingerprint sensing area FSA. The light sensing array LSL may include at least one fingerprint sensor FPS distributed at a resolution and/or interval (e.g., a set or predetermined resolution and/or interval).

An optical system may be provided on the light sensing array LSL to provide an optical path by condensing light directed to the at least one fingerprint sensor FPS. The width of a light transmission portion for guiding light in the optical system may be determined in consideration of sensing accuracy and light conversion efficiency. A light condensing rate of light incident to the at least one fingerprint sensor FPS may be improved by the optical system. The optical system may be formed of an optical fiber, silicon, or the like.

The at least one fingerprint sensor FPS may have an appropriate number, size, and arrangement so that an identifiable fingerprint image can be generated from the electrical signal (or sensing signal) output from the at least one fingerprint sensor FPS. For example, intervals between fingerprint sensors FPS may be set densely so that reflected light reflected from a target object (for example, the user's fingerprint) may be incident to at least two neighboring fingerprint sensors FPS.

The at least one fingerprint sensor FPS may sense external light and output a corresponding electrical signal (or sensing signal). Reflected light received by the at least one fingerprint sensor FPS may have optical characteristics (for example, frequency, wavelength, size, etc.) due to valleys and ridges of a fingerprint formed on the user's finger (or a palm pattern formed on the palm or a dermatoglyphic pattern formed on the skin). Accordingly, the at least one fingerprint sensor FPS may output the electrical signal (or sensing signal) corresponding to the optical characteristics of the reflected light.

The display device DD may further include a light blocking layer PHL. The light blocking layer PHL may be located inside the display panel PN or between the display panel PN and the at least one fingerprint sensor FPS to block a portion of light incident to the at least one fingerprint sensor FPS. For example, some of the light incident to the light blocking layer PHL may be blocked, and the rest may pass through pinholes PIH and reach the at least one fingerprint sensor FPS under the light blocking layer PHL. The pinholes PIH may act as an optical system and may be used with other optical systems.

The pinholes PIH may refer to optical holes and may be a kind of light transmission hole. For example, the pinholes PIH may be light transmission holes having the smallest size (or area) among light transmission holes in which layers of the display device DD overlap each other on a path through which reflected light passes through the display panel PN in an oblique or vertical direction and is incident to the at least one fingerprint sensor FPS.

The pinholes PIH may have a width (e.g., a set or predetermined width), for example, a width ranging from 5 µm to 20 µm. The width of an optical opening area to be secured in each layer of the display device DD may gradually increase as the distance from the light blocking layer PHL increases (that is, toward the upper and lower portions of the light blocking layer PHL).

The width (or diameter) of the pinholes PIH may be set to approximately 10 times or more of the wavelength of the reflected light, for example, about 4 µm or 5 µm or more so that light diffraction can be prevented or reduced. In addition, the width of the pinholes PIH may be set to such a size that image blur may be prevented or reduced and the shape of a fingerprint can be relatively clearly detected. For example, the width of the pinholes PIH may be set to about 15 µm or less. However, embodiments according to the present invention are not limited thereto, and the width of the pinholes PIH may vary depending on the wavelength band of the reflected light and/or the thickness of each layer of a module.

Only the reflected light passing through the pinholes PIH may reach sensor pixels SPXL of a photosensor PS. A phase of light reflected from a fingerprint by the pinholes PIH having a very narrow width and a phase of an image formed on the at least one fingerprint sensor FPS may have a difference of 180 degrees.

An infrared cut filter may be further located between the optical system (for example, the light blocking layer PHL) and the at least one fingerprint sensor FPS or between the display panel PN and the optical system.

Meanwhile, FIG. 2 shows aspects of embodiments in which the light blocking layer PHL including the pinholes PIH is used as the optical system, but embodiments according to the present invention are not limited thereto. For example, a micro lens type or collimator type optical system (or optical sensor) may be used.

Figure 3:
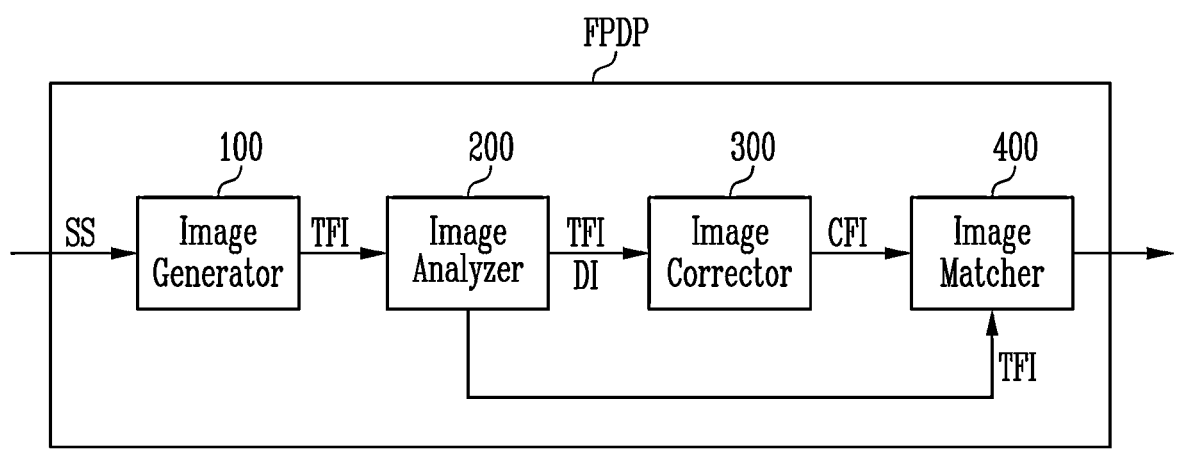
FIG. 3 is a block diagram for explaining a fingerprint detector according to some embodiments of the present invention.

FIG. 3 is a block diagram for explaining a fingerprint detector according to some embodiments of the present invention. For convenience of description, FIG. 3 illustrates an example of the fingerprint detector FPDP shown in FIG. 1C, but embodiments according to the present invention are not limited thereto.

Referring to FIGS. 1C and 3, the fingerprint detector FPDP may include an image generator 100, an image analyzer 200, an image corrector 300, and an image matcher 400.

The image generator 100 may generate a fingerprint image based on a sensing signal SS output from the at least one fingerprint sensor FPS located in the fingerprint sensing area FSA of the display panel PN. For example, the image generator 100 may determine whether an area corresponding to the at least one fingerprint sensor FPS is a ridge or a valley through a processing operation for the sensing signal SS, and may generate an entire fingerprint image by combining the determined information.

According to some embodiments, the image generator 100 may generates a target fingerprint image TFI based on the sensing signal SS output from the at least one fingerprint sensor FPS located in the first fingerprint sensing area FSA1 of the display panel PN.

The at least one fingerprint sensor FPS located in the first fingerprint sensing area FSA1 may generate the sensing signal SS by sensing the user's fingerprint corresponding to the first fingerprint sensing area FSA1, and the image generator 100 may generate the target fingerprint image TFI based on the sensing signal SS. The target fingerprint image TFI may correspond to the user's fingerprint input to the first fingerprint sensing area FSA1 and may be used for fingerprint authentication.

The image analyzer 200 may analyze the target fingerprint image TFI to detect a defect (or defect information DI) in the target fingerprint image TFI.

The defect in the target fingerprint image TFI may mean a stain, such as a dot or a line, generated in the target fingerprint image TFI due to deterioration of the fingerprint sensor FPS when a user repeatedly use the fingerprint sensing function. For example, the defect in the target fingerprint image TFI may occur due to deterioration of a driving circuit of the fingerprint sensor FPS and/or a photoelectric conversion element (for example, a photodiode) included in the fingerprint sensor FPS. The defect in the target fingerprint image TFI may occur in various forms depending on the degree of deterioration of the fingerprint sensor FPS.

According to some embodiments, the image analyzer 200 may detect the defect (or defect information DI) in the target fingerprint image TFI based on at least one first fingerprint image FI1 (shown in FIG. 4) corresponding to the first fingerprint sensing area FSA1 of the display panel PN and at least one second fingerprint image FI2 (shown in FIG. 4) corresponding to the second fingerprint sensing area FSA2 spaced apart from the first fingerprint sensing area FSA1 of the display panel PN. For example, the image analyzer 200 may detect the defect information DI about the size, shape, position, color, and the like of the defect found in the target fingerprint image TFI.

When a defect is detected in the target fingerprint image TFI, the image analyzer 200 may supply the target fingerprint image TFI and the defect information DI of the target fingerprint image TFI to the image corrector 300. When a defect is not detected in the target fingerprint image TFI, the image analyzer 200 may supply the target fingerprint image TFI to the image matcher 400. Further details of the operation of the image analyzer 200 will be described later with reference to FIG. 4.

The image corrector 300 may improve the fingerprint authentication function by correcting the defect in the target fingerprint image TFI based on the defect (or defect information DI) in the target fingerprint image TFI. That is, the image corrector 300 may generate a corrected fingerprint image CFI by correcting the defect in the target fingerprint image TFI.

According to some embodiments, the image corrector 300 may correct the defect in the target fingerprint image TFI based on the size of the defect of the target fingerprint image TFI among the defect information DI of the target fingerprint image TFI. Also, the image corrector 300 may correct the defect in the target fingerprint image TFI in different ways according to a result of comparing the size of the defect of the target fingerprint image TFI with a reference size (e.g., a set or predetermined reference size). Further details of the operation of the image corrector 300 will be described later with reference to FIGS. 5 to 11.

The image matcher 400 may perform the fingerprint authentication by matching the target fingerprint image TFI or the corrected fingerprint image CFI with a registered fingerprint image preset by a user. For example, when a defect does not occur in the target fingerprint image TFI, the image matcher 400 may match the target fingerprint image TFI supplied from the image analyzer 200 with the registered fingerprint image preset by the user.

For example, when a defect occurs in the target fingerprint image TFI, the image matcher 400 may match the corrected fingerprint image CFI supplied from the image corrector 300 with the registered fingerprint image preset by the user. The registered fingerprint image preset by the user may be stored in a separate database, and may be supplied to the image matcher 400 from the database during fingerprint authentication.

Figure 4:
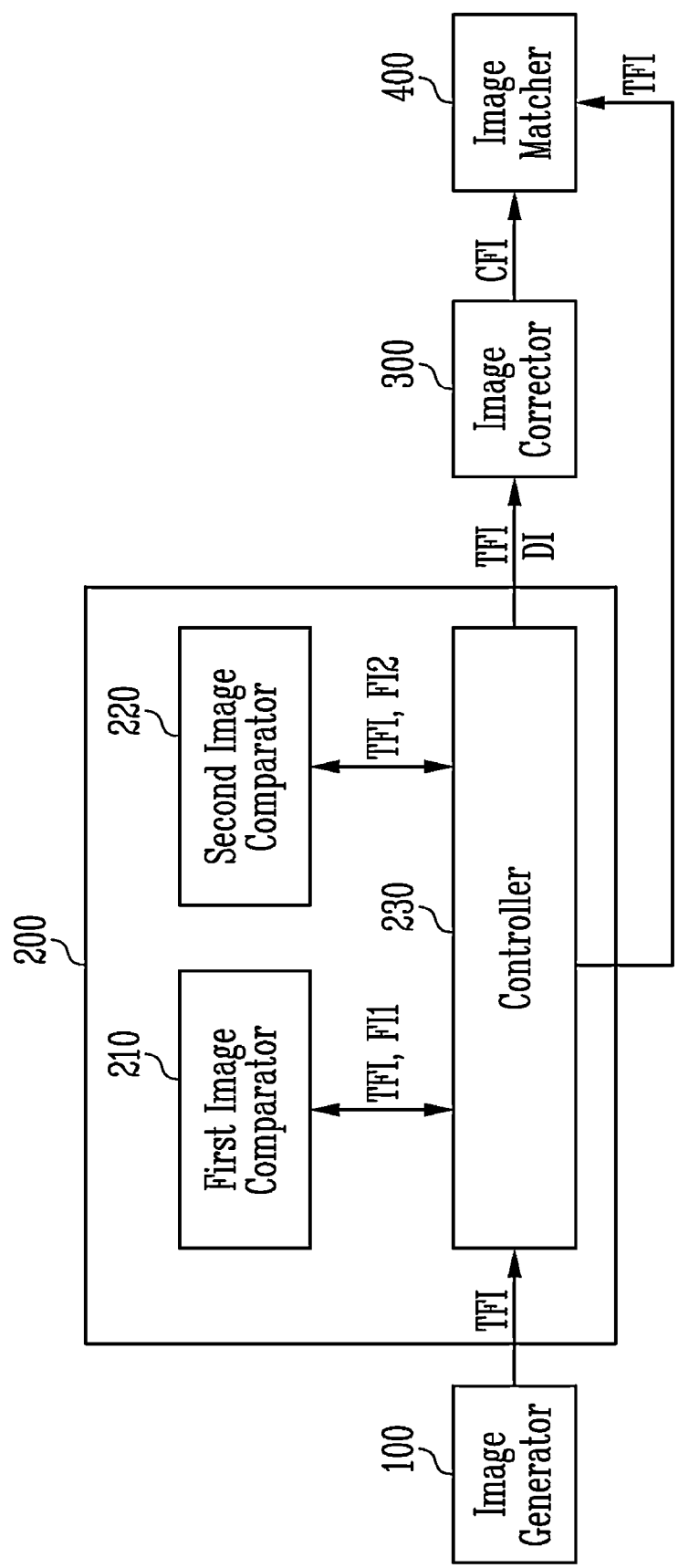
FIG. 4 is a block diagram for explaining an image analyzer of FIG. 3 according to some embodiments of the present invention.

FIG. 4 is a block diagram for explaining an image analyzer of FIG. 3.

Referring to FIGS. 1C and 4, the image analyzer 200 may include a first image comparator 210, a second image comparator 220, and a controller 230.

The first image comparator 210 may compare the target fingerprint image TFI supplied from the controller 230 with the at least one first fingerprint image FI1 to determine whether they match each other, and transmit the determined result to the controller 230.

The at least one first fingerprint image FI1 may correspond to the user's fingerprint sensed through the at least one fingerprint sensor FPS located in the first fingerprint sensing area FSA1 of the display panel PN before the target fingerprint image TFI is generated. That is, the at least one first fingerprint image FI1 may be a user's fingerprint image sensed through the first fingerprint sensing area FSA1 and stored in advance. Also, the at least one first fingerprint image FI1 may be a user's fingerprint image sensed before the at least one fingerprint sensor FPS located in the first fingerprint sensing area FSA1 is deteriorated.

The at least one first fingerprint image FI1 and the target fingerprint image TFI may have fingerprint information of the same part of the user's body. For example, when the part of the user's body is a finger, the at least one first fingerprint image FI1 and the target fingerprint image TFI may have the same fingerprint information of any one of a thumb, index finger, middle finger, ring finger, and small finger.

The second image comparator 220 may compare the target fingerprint image TFI supplied from the controller 230 with the at least one second fingerprint image FI2 to determine whether they match each other, and transmit the determined result to the controller 230.

The at least one second fingerprint image FI2 may correspond to the user's fingerprint sensed through the at least one fingerprint sensor FPS located in the second fingerprint sensing area FSA2 of the display panel PN before the target fingerprint image TFI is generated. That is, the at least one second fingerprint image FI2 may be a user's fingerprint image sensed through the second fingerprint sensing area FSA2 and stored in advance.

The at least one second fingerprint image FI2 and the target fingerprint image TFI may have fingerprint information of the same part of the user's body. For example, when the part of the user's body is a finger, the at least one second fingerprint image FI2 and the target fingerprint image TFI may have the same fingerprint information of any one of a thumb, index finger, middle finger, ring finger, and small finger.

The controller 230 may receive the target fingerprint image TFI supplied from the image generator 100.

According to some embodiments, the controller 230 may supply the target fingerprint image TFI and the at least one first fingerprint image FI1 to the first image comparator 210. The controller 230 may provide the first image comparator 210 and the at least one first fingerprint image FI1 having the fingerprint information of the same part of the user's body to the first image comparator 210.

According to some embodiments, the controller 230 may supply the target fingerprint image TFI and the at least one second fingerprint image FI2 to the second image comparator 220 according to the determined result of the first image comparator 210. For example, when the first image comparator 210 determines that the target fingerprint image TFI and the at least one first fingerprint image FI1 do not match, the controller 230 may supply the target fingerprint image TFI and the at least one second fingerprint image FI2 to the second image comparator 220. The controller 230 may provide the target fingerprint image TFI and the at least one second fingerprint image FI2 having the fingerprint information of the same part of the user's body to the second image comparator 220.

According to some embodiments, the controller 230 may determine whether a defect is detected in the target fingerprint image TFI according to the determined result transmitted from the first image comparator 210 and the determined result transmitted from the second image comparator 220.

When the first image comparator 210 determines that the target fingerprint image TFI and the at least one first fingerprint image FI1 match, the controller 230 may determine that no defect is detected in the target fingerprint image TFI. Accordingly, the controller 230 may supply the target fingerprint image TFI to the image matcher 400. The image matcher 400 may perform fingerprint authentication by matching the target fingerprint image TFI with the registered fingerprint image preset by the user.

When the first image comparator 210 determines that the target fingerprint image TFI and the at least one first fingerprint image FI1 do not match, the controller 230 may first determine that a defect is detected in the target fingerprint image TFI. Thereafter, when the second image comparator 220 determines that the target fingerprint image TFI and the at least one second fingerprint image FI2 do not match, the controller 230 may secondarily (or finally) determine that a defect is detected in the target fingerprint image TFI.

Here, mismatch between the target fingerprint image TFI and the at least one second fingerprint image FI2 may mean that a defect occurs in the target fingerprint image TFI as at least one fingerprint sensor FPS located in one area of the first fingerprint sensing area FSA1 deteriorates. That is, the controller 230 may relatively accurately detect the defect (or defect information DI) in the target fingerprint image TFI due to deterioration of at least one fingerprint sensor FPS located in one area of the first fingerprint sensing area FSA1 based on determined results of the first image comparator 210 and the second image comparator 220.

Accordingly, the controller 230 may supply the target fingerprint image TFI and the defect information DI of the target fingerprint image to the image corrector 300. The image corrector 300 may generate the corrected fingerprint image CFI by correcting the defect in the target fingerprint image TFI based on the defect information DI of the target fingerprint image, and the image matcher 400 may perform fingerprint authentication by matching the corrected fingerprint image CFI with the registered fingerprint image CFI preset by the user.

When the first image comparator 210 determines that the target fingerprint image TFI and the at least one first fingerprint image FI1 do not match, the controller 230 may first determine that a defect is detected in the target fingerprint image TFI. However, when the second image comparator 220 determines that the target fingerprint image TFI and the at least one second fingerprint image FI2 match, the controller 230 may determine that no defect is detected in the target fingerprint image TFI.

Here, matching between the target fingerprint image TFI and the at least one second fingerprint image FI2 may refer to a defect occurring in the target fingerprint image TFI due to a state change (for example, a wound on a finger) of the part of the user's body input during fingerprint authentication. Accordingly, the controller 230 may supply the target fingerprint image TFI to the image matcher 400. The image matcher 400 may perform fingerprint authentication by matching the target fingerprint image TFI with the registered fingerprint image preset by the user.

In this way, the controller 230 may more accurately detect the defect in the target fingerprint image TFI due to deterioration of the fingerprint sensor FPS according to the determined result transmitted from the first image comparator 210 and the determined result transmitted from the second image comparator 220.

FIGS. 5 to 8 are diagrams for explaining correction methods when a large defect occurs in a target fingerprint image. In FIGS. 5 to 8, the large defect in the target fingerprint image TFI may mean a case in which the defect of the target fingerprint image TFI is greater than or equal to a reference size (e.g., a set or predetermined reference size) (length or number). That is, when the defect of the target fingerprint image TFI is greater than or equal to the reference size (e.g., the set or predetermined reference size) (length or number), a change in feature points of the user's fingerprint may occur, and the fingerprint authentication function may deteriorate. For convenience of description, FIGS. 5 to 8 show, for example, target fingerprint images TFI in which the same defect occurs.

Figure 5:
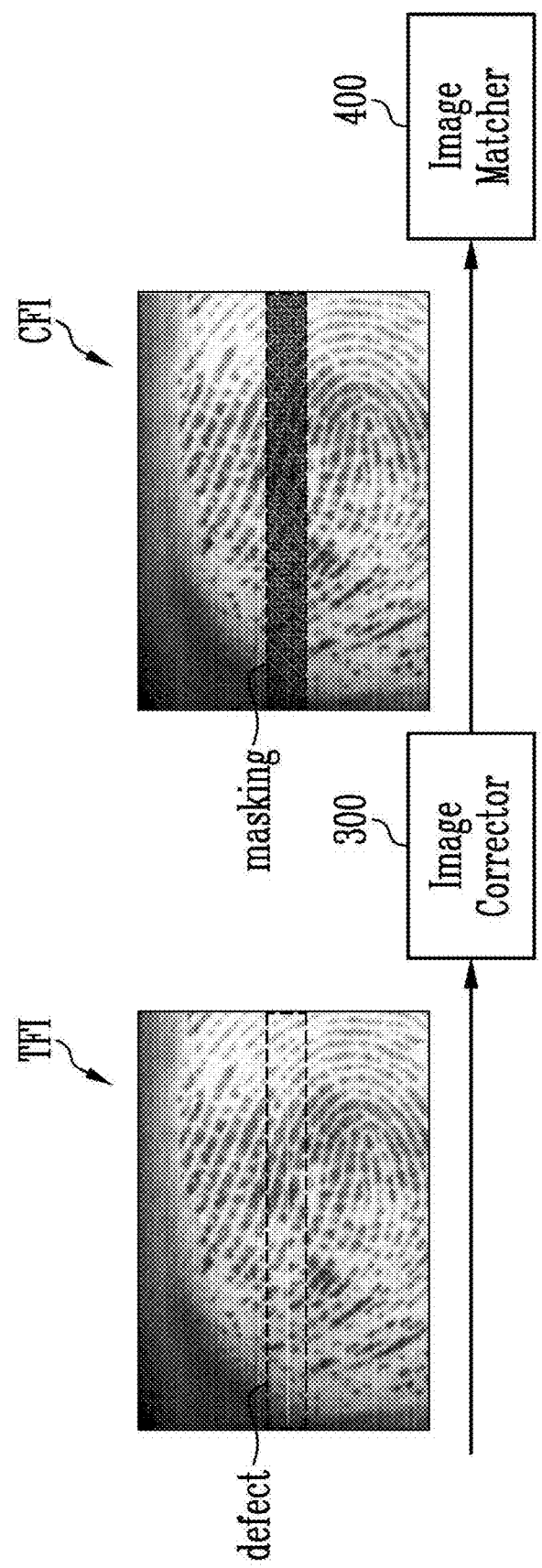

Referring to FIG. 5, when the defect of the target fingerprint image TFI is greater than or equal to the reference size (e.g., the set or predetermined reference size) (length or number), the image corrector 300 may generate the corrected fingerprint image CFI by masking the defect in the target fingerprint image TFI. That is, the image corrector 300 may prevent deterioration of the fingerprint authentication function by masking the defect in the target fingerprint image TFI. The image matcher 400 may perform fingerprint authentication by matching the corrected fingerprint image CFI with the registered fingerprint image preset by the user. In particular, the image matcher 400 may improve the accuracy of the fingerprint authentication function by matching an area other than the masked area in the corrected fingerprint image CFI with the registered fingerprint image preset by the user.

Figure 6:
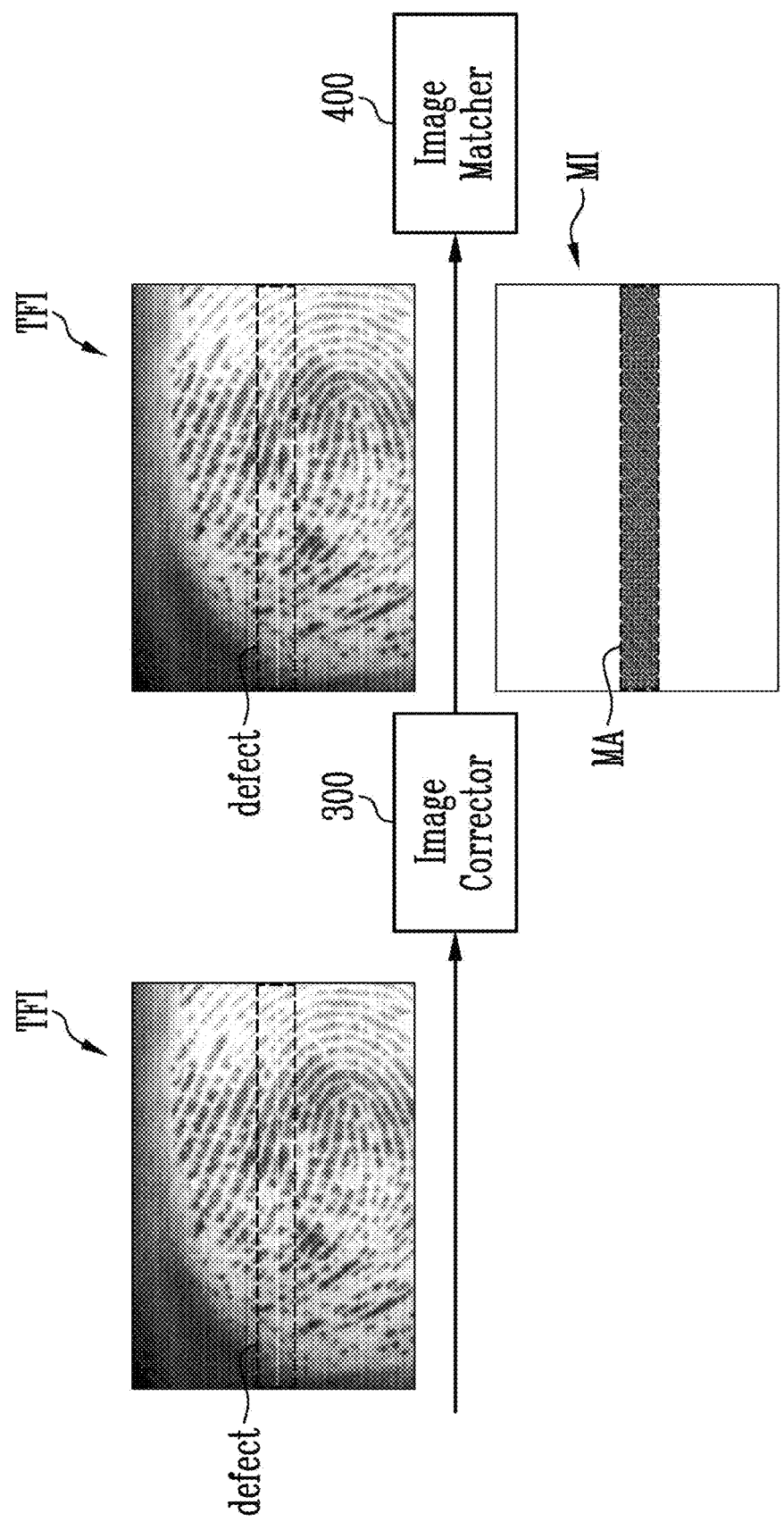

Referring to FIG. 6, when the defect of the target fingerprint image TFI is greater than or equal to the reference size (e.g., the set or predetermined reference size) (length or number), the image corrector 300 generates a masking image MI in which a masking area MA in which the defect is covered is formed in the target fingerprint image TFI. The image matcher 400 may perform fingerprint authentication based on the target fingerprint image TFI, the masking image MI, and the registered fingerprint image preset by the user. For example, the image matcher 400 may perform fingerprint authentication by matching an area other than the area corresponding to the masking area MA of the masking image MI in the target fingerprint image TFI with the registered fingerprint image preset by the user.

Referring to FIGS. 1C, 3, and 7, when the defect of the target fingerprint image TFI is greater than or equal to the reference size (e.g., the set or predetermined reference size) (length or number), at least one fingerprint sensor FPS may expand an area for sensing an additional user's fingerprint.

For example, when the user's fingerprint is input to the first fingerprint sensing area FSA1 of the display panel PN, at least one fingerprint sensor FPS may generate the sensing signal by sensing the user's fingerprint through a third fingerprint sensing area FSA3 included in the first fingerprint sensing area FSA1. That is, the at least one fingerprint sensor FPS may sense only a part of the user's fingerprint. The image generator 100 may generate the target fingerprint image TFI based on the sensing signal.

When the defect of the target fingerprint image TFI is greater than or equal to the reference size (e.g., the set or predetermined reference size) (length or number), when the additional user's fingerprint is input to the first fingerprint sensing area FSA1 of the display panel PN, the at least one fingerprint sensor FPS may generate the sensing signal by sensing the additional user's fingerprint through a fourth fingerprint sensing area FSA4 overlapping the entire third fingerprint sensing area FSA3 and wider than the third fingerprint sensing area FSA3. The image generator 100 may generate a target fingerprint image TFI' based on the sensing signal.

That is, by expanding an area for detecting the additional user's fingerprint and generating the target fingerprint image TFI' corresponding to the additional user's fingerprint, because the effect of the defect in the target fingerprint image TFI on fingerprint authentication may be reduced, the fingerprint authentication function can be improved.

Figure 8:
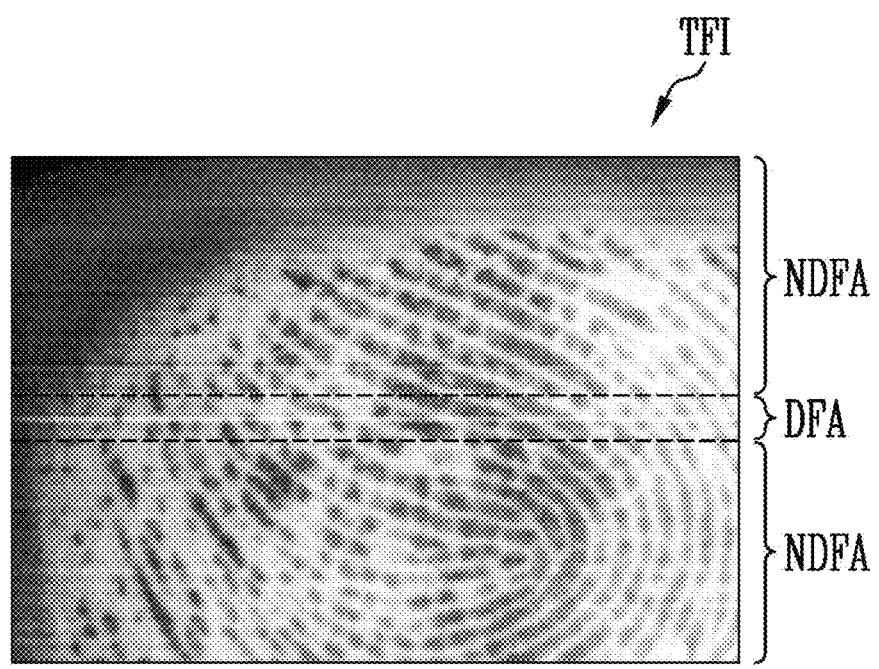

Referring to FIGS. 1C and 8, when the defect of the target fingerprint image TFI is greater than or equal to the reference size (e.g., the set or predetermined reference size) (length or number), the exposure time of the at least one fingerprint sensor FPS may increase when the additional user's fingerprint is sensed.

For example, when the user's fingerprint is input to the first fingerprint sensing area FSA1 of the display panel PN, at least one fingerprint sensor FPS located in the first fingerprint sensing area FSA1 may sense the user's fingerprint by being exposed to light for a first exposure time. Thereafter, when the additional user's fingerprint is input to the first fingerprint sensing area FSA1 of the display panel PN, at least one fingerprint sensor located in an area DFA corresponding to the defect of the target fingerprint image TFI may sense the additional user's fingerprint by being exposed to light for a second exposure time longer than the first exposure time.

On the other hand, at least one fingerprint sensor located in a non-defective area NDFA of the target fingerprint image TFI may sense the user's fingerprint by being exposed to light for the first exposure time. That is, the fingerprint authentication function may be improved by increasing the exposure time of at least one fingerprint sensor located in a defective area DFA of the target fingerprint image TFI.

Figure 9:
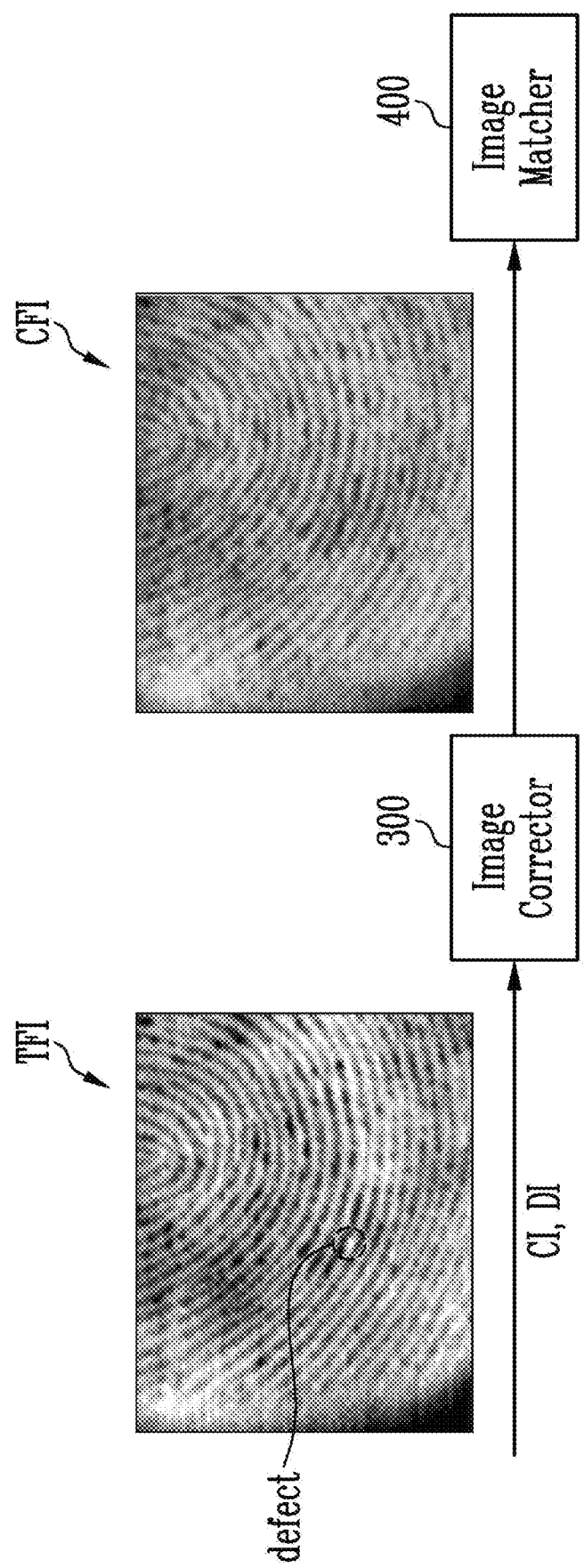
FIGS. 9, 10, and 11 are diagrams for explaining correction methods when a small defect occurs in a target fingerprint image according to some embodiments of the present invention.
Figure 10:
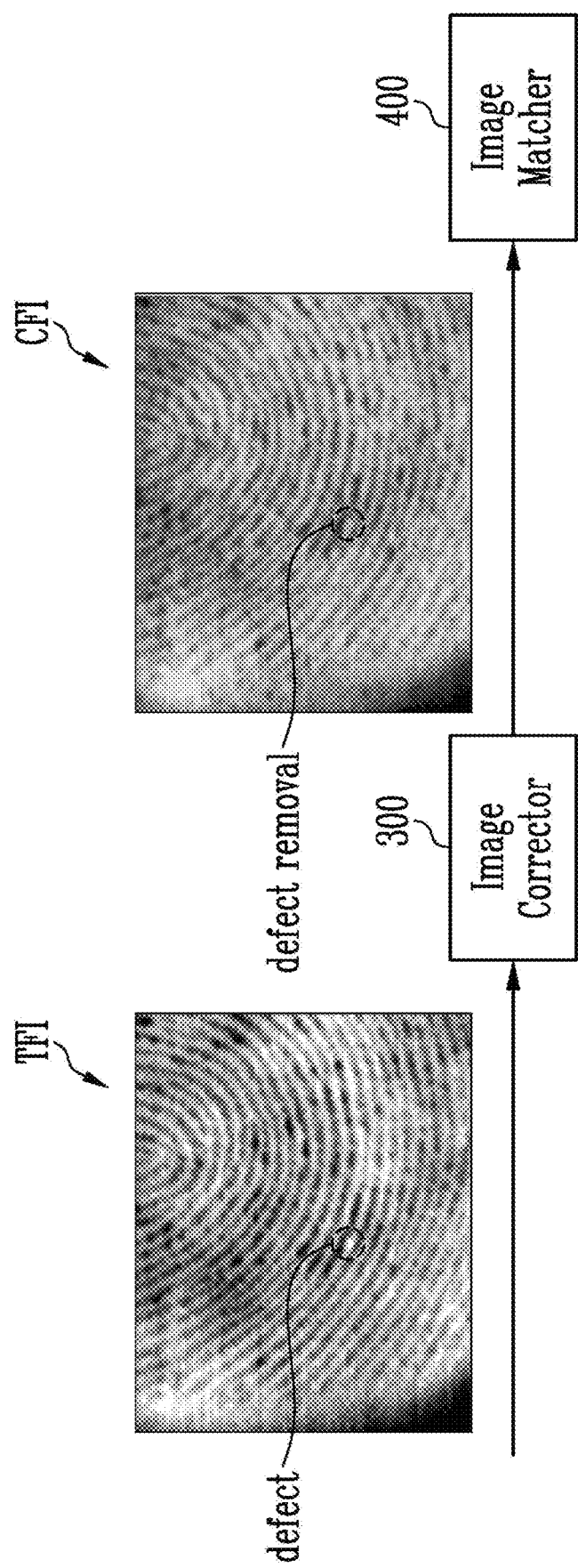
Figure 11:
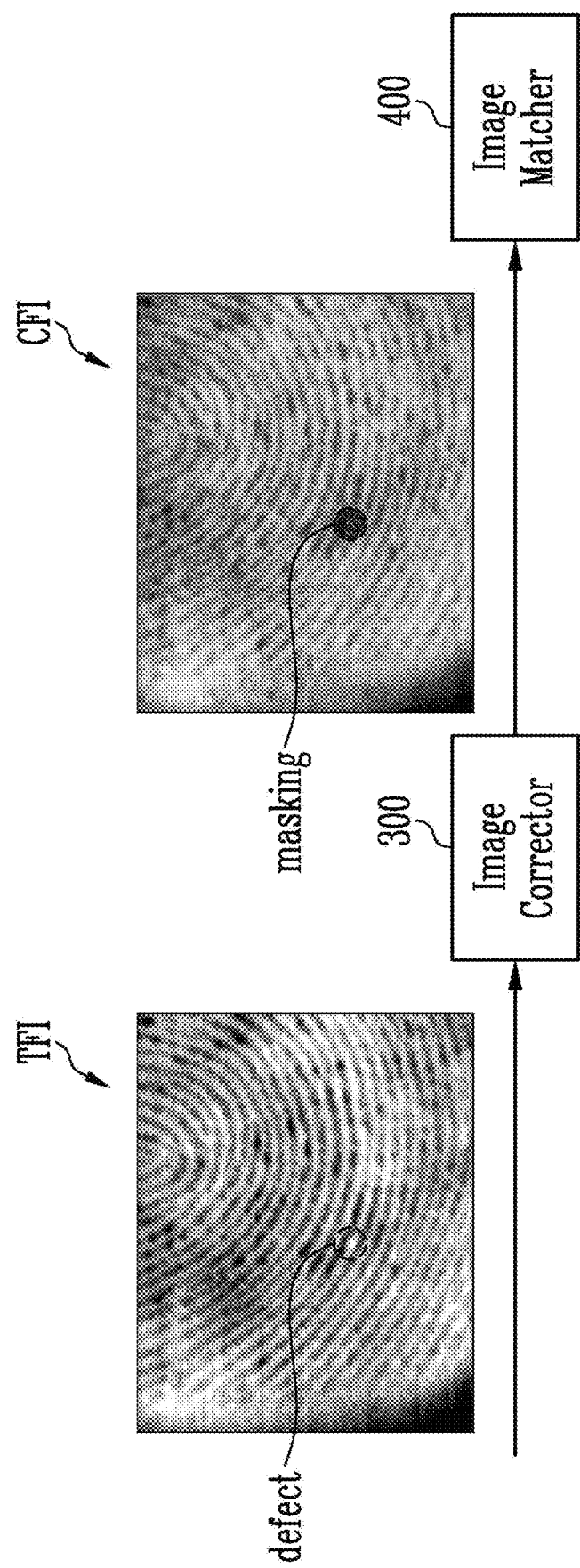

FIGS. 9 to 11 are diagrams for explaining correction methods when a small defect occurs in a target fingerprint image. In FIGS. 9 to 11, the small defect in the target fingerprint image TFI may refer to a case in which the defect of the target fingerprint image TFI is less than the reference size (e.g., the set or predetermined reference size) (length or number). That is, when the defect of the target fingerprint image TFI is less than the reference size (e.g., the set or predetermined reference size) (length or number), the fingerprint authentication function may not be significantly affected, but if accumulated, the fingerprint authentication function may deteriorate. For convenience of description, FIGS. 9 to 11 show, for example, target fingerprint images TFI in which the same defect occurs.

Referring to FIG. 9, when the defect of the target fingerprint image TFI is less than the reference size (e.g., the set or predetermined reference size) (length and number), the image corrector 300 may generate the corrected fingerprint image CFI by correcting the defect in the target fingerprint image TFI based on pre-stored calibration information CI and the defect information DI of the target fingerprint image TFI. The calibration information CI may include information for calibrating noise (or error) caused by the reflected light received by the fingerprint sensor FPS, an optical path, deviation of the fingerprint sensor FPS, and the like. The image corrector 300 may generate the corrected fingerprint image CFI by performing calibration on the target fingerprint image TFI by reflecting the defect information DI of the target fingerprint image TFI in the calibration information CI. The image matcher 400 may perform fingerprint authentication by matching the corrected fingerprint image CFI with the registered fingerprint image preset by the user.

Referring to FIG. 10, when the defect of the target fingerprint image TFI is less than the reference size (e.g., the set or predetermined reference size) (length or number), the image corrector 300 may generate the corrected fingerprint image CFI by erasing the defect in the target fingerprint image TFI through image processing. The image matcher 400 may perform fingerprint authentication by matching the corrected fingerprint image CFI with the registered fingerprint image preset by the user.

Referring to FIG. 11, when the defect of the target fingerprint image TFI is less than the reference size (e.g., the set or predetermined reference size) (length or number), the image corrector 300 may generate the corrected fingerprint image CFI by masking the defect in the target fingerprint image TFI. That is, the image corrector 300 may prevent deterioration of the fingerprint authentication function by masking the defect in the target fingerprint image TFI. The image matcher 400 may perform fingerprint authentication by matching the corrected fingerprint image CFI with the registered fingerprint image preset by the user.

As shown in FIGS. 9 to 11, deterioration of the fingerprint authentication function may be prevented by erasing the defect in the target fingerprint image TFI before matching.

FIG. 12 is a flowchart for explaining a driving method of a display device according to some embodiments of the present invention. FIG. 13 is a flowchart for explaining a step of detecting a defect in a target fingerprint image. Although FIGS. 12 and 13 illustrate various operations, embodiments according to the present disclosure are not limited thereto, and according to some embodiments, the number of operations or the order of operations may vary. Additionally, in some embodiments, there may be additional operations or fewer operations without departing from the spirit and scope of embodiments according to the present disclosure. In FIGS. 12 and 13, contents overlapping with those described above will be omitted or briefly described.

Referring to FIG. 12, a driving method of a display device may include sensing a user's fingerprint corresponding to a first fingerprint sensing area of a display panel (S100), generating a target fingerprint image (S200), detecting a defect in the target fingerprint image based on at least one first fingerprint image corresponding to the first fingerprint sensing area and at least one second fingerprint image corresponding to a second fingerprint sensing area spaced apart from the first fingerprint sensing area of the display panel (S300), correcting the defect in the target fingerprint image (S400), and performing fingerprint authentication based on a registered fingerprint image of a user (S500).

In the sensing the user's fingerprint (S100), the sensing signal SS may be generated by sensing the user's fingerprint input to the first fingerprint sensing area FSA1 of the display panel PN.

In the generating the target fingerprint image (S200), the target fingerprint image TFI may be generated based on the sensing signal SS. The target fingerprint image TFI may be a user's fingerprint image used for currently performed fingerprint authentication.

In the detecting the defect (S300), the defect may be detected in the target fingerprint image TFI based on at least one first fingerprint image FI1 corresponding to the first fingerprint sensing area FSA1 and at least one second fingerprint image FI2 corresponding to the second fingerprint sensing area FSA2 spaced apart from the first fingerprint sensing area FSA2 of the display panel PN. The first fingerprint image FI1 may be a user's fingerprint image sensed through the first fingerprint sensing area FSA1 of the display panel PN and stored in advance. The second fingerprint image FI2 may be a user's fingerprint image sensed through the second fingerprint sensing area FSA2 spaced apart from the first fingerprint sensing area FSA1 of the display panel PN and stored in advance.

When the defect is detected in the target fingerprint image TFI in the detecting the defect (S300), the correcting the defect (S400) may be performed. When the defect is not detected in the target fingerprint image TFI in the detecting the defect (S300), the correcting the defect (S400) may not be performed and the performing the fingerprint authentication (S500) may be performed.

Referring to FIG. 13, the detecting the defect (S300) may include comparing the target fingerprint image with at least one first fingerprint image (S310) and comparing the target fingerprint image with at least one second fingerprint image (S320).

In the comparing the target fingerprint image with at least one first fingerprint image (S310), it may be first determine whether a defect occurs in the target fingerprint image TFI by comparing the target fingerprint image TFI with at least one first fingerprint image FI1.

For example, when the target fingerprint image TFI and the at least one first fingerprint image FI1 match, it may be determined that no defect is detected in the target fingerprint image TFI, and then the performing the fingerprint authentication (S500) may be performed. For example, when the target fingerprint image TFI and the at least one first fingerprint image FI1 do not match, it may be first determined that the defect is detected in the target fingerprint image TFI, and then the comparing the target fingerprint image with the at least one second fingerprint image (S320) may be performed.

In the comparing the target fingerprint image with at least one second fingerprint image (S320), it may be secondarily (or finally) determine whether a defect occurs in the target fingerprint image TFI by comparing the target fingerprint image TFI with at least one second fingerprint image FI2.

For example, when the target fingerprint image TFI and the at least one second fingerprint image FI2 match, it may be determined that the defect occurred in the target fingerprint image TFI is not due to deterioration of at least one fingerprint sensor located in the first fingerprint sensing area FSA1, but is due to a state change of the part of the user's body (for example, a wound on a finger). Subsequently, the performing the fingerprint authentication (S500) may be performed. For example, when the target fingerprint image TFI and the at least one second fingerprint image FI2 do not match, it may be determined that the defect occurred in the target fingerprint image TFI is due to deterioration of at least one fingerprint sensor FPS located in the first fingerprint sensing area FSA1. Subsequently, the correcting the defect (S400) may be performed.

In the correcting the defect (S400), the defect in the target fingerprint image TFI may be corrected based on the size of the defect in the target fingerprint image TFI. Because correction methods based on the size of the defect may be the same as those described above, a detailed description thereof will be omitted.

In the performing the fingerprint authentication (S500), fingerprint authentication may be performed by matching the target fingerprint image TFI or the corrected fingerprint image CFI with the registered fingerprint image preset by the user.

According to the display device and the driving method thereof according to the present invention, a defect in a fingerprint image due to deterioration of a fingerprint sensor can be relatively accurately detected, and the defect in the fingerprint image can be corrected in various ways, thereby relatively improving the fingerprint authentication function.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although aspects of some embodiments of the present invention have been specifically described according to the above-described embodiments, it should be noted that the above-described embodiments are intended to illustrate the present invention and not to limit the scope of the present invention. Those of ordinary skill in the art to which the present invention pertains will understand that various modifications are possible within the scope of the technical spirit of the present invention.

Therefore, the technical protection scope of the present invention is not limited to the detailed description described in the specification, but should be determined by the appended claims and their equivalents. In addition, all changes or modifications derived from the meaning and scope of the claims and their equivalents should be construed as being included in the scope of the present invention.

What is claimed is:

1. A display device comprising:
    at least one fingerprint sensor configured to sense a fingerprint of a user corresponding to a first fingerprint sensing area of a display panel;
    an image generator configured to generate a target fingerprint image based on a sensing signal output from the at least one fingerprint sensor;
    an image analyzer configured to detect a defect in the target fingerprint image based on at least one first fingerprint image corresponding to the first fingerprint sensing area and at least one second fingerprint image corresponding to a second fingerprint sensing area spaced apart from the first fingerprint sensing area of the display panel; and
    an image corrector configured to correct the defect in the target fingerprint image,
    wherein the at least one first fingerprint image and the at least one second fingerprint image each represent an entirety of the fingerprint of the user.

2. The display device of claim 1, wherein the image corrector is configured to correct the defect in the target fingerprint image based on a size of the defect of the target fingerprint image.

3. The display device of claim 1, wherein the target fingerprint image, the at least one first fingerprint image, and the at least one second fingerprint image have fingerprint information of a same part of the user's body.

4. The display device of claim 1, wherein the at least one first fingerprint image is sensed through the first fingerprint sensing area and stored in advance; and
    wherein the at least one second fingerprint image is sensed through the second fingerprint sensing area and stored in advance.

5. The display device of claim 1, wherein the image analyzer includes:
    a first image comparator configured to compare the target fingerprint image with the at least one first fingerprint image;
    a second image comparator configured to compare the target fingerprint image with the at least one second fingerprint image; and
    a controller configured to determine whether to detect the defect in the target fingerprint image according to a comparison result with the at least one first fingerprint image and a comparison result with the at least one second fingerprint image.

6. The display device of claim 5, wherein the controller is configured to determine that the defect is detected in the target fingerprint image based on the target fingerprint image not matching the at least one first fingerprint image and the target fingerprint image not matching the at least one second fingerprint image.

7. The display device of claim 1, wherein based on the defect of the target fingerprint image being greater than or equal to a predetermined reference size, the image corrector is configured to mask the defect in the target fingerprint image.

8. The display device of claim 1, wherein based on the defect of the target fingerprint image being greater than or equal to a predetermined reference size, the image corrector is configured to generate a masking image covering the defect in the target fingerprint image.

9. The display device of claim 8, further comprising:
    an image matcher configured to perform fingerprint authentication based on the target fingerprint image, the masking image, and a registered fingerprint image preset by a user.

10. The display device of claim 1, wherein the at least one fingerprint sensor is configured to sense the fingerprint of the user through a third fingerprint sensing area included in the first fingerprint sensing area of the display panel,
    wherein based on the defect of the target fingerprint image being greater than or equal to a predetermined reference size, the at least one fingerprint sensor is configured to sense an additional user's fingerprint through a fourth fingerprint sensing area overlapping an entirety of the third fingerprint sensing area based on the additional user's fingerprint being input to the third fingerprint sensing area of the display panel, and
    wherein the fourth fingerprint sensing area has a larger area than the third fingerprint sensing area.

11. The display device of claim 1, wherein the at least one fingerprint sensor is exposed to light for a first exposure time, and
    wherein based on the defect of the target fingerprint image being greater than or equal to a predetermined reference size, the at least one fingerprint sensor in an area corresponding to the defect of the target fingerprint image is exposed to the light for a second exposure time longer than the first exposure time based on an additional user's fingerprint being input to the first fingerprint sensing area.

12. The display device of claim 1, wherein based on the defect of the target fingerprint image being less than a predetermined reference size, the image corrector is configured to correct the defect in the target fingerprint image based on defect information and pre-stored calibration information.

13. The display device of claim 1, wherein based on the defect of the target fingerprint image being less than a predetermined reference size, the image corrector is configured to correct the defect in the target fingerprint image by erasing the defect in the target fingerprint image through image processing.

14. The display device of claim 1, wherein based on the defect of the target fingerprint image being less than a predetermined reference size, the image corrector is configured to correct the defect in the target fingerprint image by masking the defect in the target fingerprint image.

15. A driving method of a display device, the method comprising:
    generating a sensing signal by sensing a fingerprint of a user corresponding to a first fingerprint sensing area of a display panel;
    generating a target fingerprint image based on the sensing signal;
    detecting a defect in the target fingerprint image based on at least one first fingerprint image corresponding to the first fingerprint sensing area and at least one second fingerprint image corresponding to a second fingerprint sensing area spaced apart from the first fingerprint sensing area of the display panel; and correcting the defect in the target fingerprint image, wherein the at least one first fingerprint image and the at least one second fingerprint image each represent an entirety of the fingerprint of the user.

16. The driving method of claim 15, wherein correcting the defect includes:

correcting the defect in the target fingerprint image based on a size of the defect of the target fingerprint image.

17. The driving method of claim 15, wherein the target fingerprint image, the at least one first fingerprint image, and the at least one second fingerprint image have fingerprint information of a same part of the user's body.

18. The driving method of claim 15, wherein the at least one first fingerprint image is sensed through the first fingerprint sensing area and stored in advance; and wherein the at least one second fingerprint image is sensed through the second fingerprint sensing area and stored in advance.

19. The driving method of claim 15, wherein detecting the defect includes:

comparing the target fingerprint image with the at least one first fingerprint image; and comparing the target fingerprint image with the at least one second fingerprint image.

20. The driving method of claim 19, further comprising determining that the defect is detected in the target fingerprint image based on the target fingerprint image not matching the at least one first fingerprint image and the target fingerprint image not matching the at least one second fingerprint image.

* * * * *